United States Patent
Morio et al.

(10) Patent No.: US 11,542,380 B2
(45) Date of Patent: Jan. 3, 2023

(54) FOAM MOLDED PRODUCT OF THERMOPLASTIC POLYESTER ELASTOMER RESIN AND METHOD FOR PRODUCING THE SAME

(71) Applicant: TOYOBO CO., LTD., Osaka (JP)

(72) Inventors: Eri Morio, Shiga (JP); Takuya Akaishi, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 489 days.

(21) Appl. No.: 16/621,818

(22) PCT Filed: Jun. 25, 2018

(86) PCT No.: PCT/JP2018/024000
§ 371 (c)(1),
(2) Date: Dec. 12, 2019

(87) PCT Pub. No.: WO2019/004121
PCT Pub. Date: Jan. 3, 2019

(65) Prior Publication Data
US 2020/0123341 A1    Apr. 23, 2020

(30) Foreign Application Priority Data
Jun. 27, 2017    (JP) .............................. JP2017-124910

(51) Int. Cl.
| *C08J 9/34* | (2006.01) |
| *C08J 9/12* | (2006.01) |
| *B29C 45/56* | (2006.01) |
| *B29C 44/42* | (2006.01) |
| *C08J 9/00* | (2006.01) |
| *C08L 67/02* | (2006.01) |
| *B29K 67/00* | (2006.01) |
| *B29K 105/04* | (2006.01) |

(52) U.S. Cl.
CPC ................ *C08J 9/34* (2013.01); *B29C 44/42* (2013.01); *B29C 45/56* (2013.01); *C08J 9/0061* (2013.01); *C08J 9/122* (2013.01); *C08L 67/025* (2013.01); *B29K 2067/00* (2013.01); *B29K 2105/04* (2013.01); *C08J 2203/06* (2013.01); *C08J 2203/08* (2013.01); *C08J 2367/02* (2013.01); *C08J 2425/14* (2013.01); *C08L 2203/14* (2013.01)

(58) Field of Classification Search
CPC ............ C08J 9/34; C08J 9/0061; C08J 9/122; C08J 2203/06; C08J 2203/08; C08J 2367/02; C08J 2425/14; C08J 2205/044; C08J 2371/02; C08J 9/06; C08J 9/12; C08J 9/22; B29C 44/42; B29C 45/56; B29C 45/00; C08L 67/025; C08L 2203/14; B29K 2067/00; B29K 2105/04; B32B 5/18; B32B 27/36; C08G 63/181; C08G 63/47; C08G 63/64; C08G 63/672
See application file for complete search history.

(56) References Cited

U.S. PATENT DOCUMENTS

| 2013/0011657 A1 | 1/2013 | Kato et al. |
| 2014/0162050 A1 | 6/2014 | Kodama et al. |

FOREIGN PATENT DOCUMENTS

| JP | 62-4729 | 1/1987 |
| JP | 5-302022 | 11/1993 |
| JP | 7-80885 | 3/1995 |
| JP | 11-323110 | 11/1999 |
| JP | 2001-205724 | 7/2001 |
| JP | 2003-342343 | 12/2003 |
| JP | 2009-29895 | 2/2009 |
| JP | 2012-140532 | 7/2012 |
| JP | 2013-32492 | 2/2013 |
| JP | 2013-53298 | 3/2013 |
| WO | 2014/098255 | 6/2014 |

OTHER PUBLICATIONS

International Search Report (ISR) dated Sep. 4, 2018 in International (PCT) Application No. PCT/JP2018/024000.
Extended European Search Report dated Jan. 20, 2021 in European Patent Application No. 18823301.9.

*Primary Examiner* — Irina S Zemel
(74) *Attorney, Agent, or Firm* — Wenderoth, Lind & Ponack, L.L.P.

(57) ABSTRACT

According to the present invention, there is provided a foam molded product of thermoplastic polyester elastomer resin which exhibits light weight and excellent rebound resilience. The foam molded product is characterized in that, the foam molded product has a foamed layer consisting of a resin phase and an isolated foamed cell.

7 Claims, 1 Drawing Sheet

FOAM MOLDED PRODUCT OF THERMOPLASTIC POLYESTER ELASTOMER RESIN AND METHOD FOR PRODUCING THE SAME

TECHNICAL FIELD OF THE INVENTION

The present invention relates to a foam molded product of a thermoplastic polyester elastomer resin which exhibits high flexibility and excellent mechanical characteristics. More particularly, the foam molded product of the present invention exhibits lightweight and high rebound resilience, and can provide a foam molded item of good quality by an easy molding method.

BACKGROUND ART

A thermoplastic polyester elastomer exhibits excellent injection molding ability and excellent extrusion molding ability, high mechanical strength, excellent rubber properties such as elasticity recovery, shock resistance and flexibility, as well as excellent cold resistance. Therefore, the thermoplastic polyester elastomer has been used in fields such as automobile parts, electric/electronic parts, fiber, film and sports parts.

A thermoplastic polyester elastomer exhibits excellent heat aging resistance, excellent light resistance and excellent abrasion resistance. Therefore, a thermoplastic polyester elastomer has been adopted as automobile parts and particularly for parts to be used under high-temperature environments and for interior parts of automobiles. In recent years, there has been a demand to make a weight of resin parts light. As one of the means for achieving such an object, application of foam molded product may be exemplified.

However, a polyester elastomer produced by a melt polycondensation method usually has relatively low melt viscosity. Accordingly, moldability cannot be secured when the polyester elastomer is applied for a molding method which requires high melt viscosity such as a foam molding method, a blow molding method, an extrusion molding method, etc. Accordingly, it has been proposed to increase the melt viscosity to a level which is applicable for the blow molding method or the extrusion molding method by compounding a cross-linking agent or a thickener with the polymer prepared by the melt polycondensation method (For example, please see Patent Documents 1, 2, and 3).

According to the above method, it is possible to prepare a polyester elastomer having high melt viscosity. However, the preparation reaction is not sufficiently controlled. Accordingly, the melt viscosity of the resulting polyester elastomer greatly depends upon a retention time. Particularly when a foam molded product is to be prepared, a composition obtained by the above method is easily gelled under some conditions. Accordingly, when sufficient melt tension is provided, it tends to be gelled whereby stable fluidity is hardly achieved and a molded item in uniform thickness is hardly achieved. Moreover, although all of the cited documents refer to an effect by thickening, none of them refers to details of a method for efficiently preparing a foam molded item and details of a polyester elastomer composition suitable for the preparation of the foam molded item.

In Patent Document 4, a foam molded product in high quality is prepared by controlling the melt tension of a polyester elastomer composition and also by suppressing the gelling. However, the resulting foam molded product has high density. Accordingly, it is still impossible to prepare a foam product having low density in a level which is sufficient for achieving the light weight. In addition, cushion property and repulsive property demanded for a foam molded item are not taken into consideration at all in the Patent Document 4.

As to a foamed product being advantageously used for car sheet, a highly repulsive urethane foamed product which exhibits rebound resilience of 60% or more has been advantageously adopted. In Patent Document 5, a method for preparing such urethane foamed product is proposed. However, a urethane foam product generates a cyan gas upon burning. Accordingly, there is a problem of environment pollution.

PRIOR ART DOCUMENTS

Patent Documents

Patent Document 1: Japanese Patent Application Laid-Open (JP-A) No. 323110/99
Patent Document 2: Japanese Patent Application Laid-Open (JP-A) No. 302022/93
Patent Document 3: Japanese Patent Application Laid-Open (JP-A) No. 2009-29895
Patent Document 4: Japanese Patent Application Laid-Open (JP-A) No. 2012-140532
Patent Document 5: Japanese Patent Application Laid-Open (JP-A) No. 2003-342343

DISCLOSURE OF THE INVENTION

Problem that the Invention is to Solve

The present invention has been achieved in view of the current status of the prior art as mentioned above. An object of the present invention is to provide a thermoplastic polyester elastomer resin foam molded product which exhibits light weight and excellent rebound resilience.

Means for Solving the Problem

In order to achieve the above object, the inventors of the present invention have extensively investigated a composition and a foamed structure of a thermoplastic polyester elastomer. As a result, it has been found that a resin foam molded product having very high rebound resilience can be prepared when a ratio of a hard segment and a soft segment of the thermoplastic polyester elastomer is controlled to a specific ratio and a size of a foamed cell is controlled to a specific size. It has been further found that a polyester elastomer foam molded product in good quality can be easily prepared and provided by applying a process wherein the resin is filled in a mold by means of injection molding and then subjected to a cavity expansion by a core back of the mold. As a result, the present invention has been achieved.

Thus, the present invention is constituted from the following (1) to (7).

(1) A foam molded product of thermoplastic polyester elastomer resin, characterized in that, the foam molded product has a foamed layer consisting of a resin phase and an isolated foamed cell, wherein the resin phase contains a thermoplastic polyester elastomer (A), wherein the thermoplastic polyester elastomer (A) is prepared by bonding a hard segment and at least one soft segment, wherein the hard segment consists of polyester constituted from aromatic dicarboxylic acid and aliphatic and/or alicyclic diol as constituting ingredients, wherein the at least one soft segment is selected from a group consisting of aliphatic polyether, aliphatic polyester and aliphatic polycarbonate, wherein a content of the soft segment is 55 to 90% by mass, wherein an average cell diameter of the foamed cell is 10 to 400 μm, wherein the maximum cell diameter of the foamed cell is 10 to 500 μm, wherein rebound resilience of the foam molded product is 60 to 90%, and wherein density of the foam molded product is 0.1 to 0.35 g/cm$^3$.

(2) The foam molded product of thermoplastic polyester elastomer resin according to (1), wherein the average cell diameter of the foamed cell is 200 to 400 μm.

(3) The foam molded product of thermoplastic polyester elastomer resin according to (1) or (2), wherein the density of the foam molded product is 0.1 to 0.25 g/cm$^3$.

(4) The foam molded product of thermoplastic polyester elastomer resin according to (1) or (2), wherein the rebound resilience of the foam molded product is 70% to 90%.

(5) The foam molded product of thermoplastic polyester elastomer resin according to any of (1) to (4), wherein each of a surface layer has a non-foamed skin layer having a thickness of 100 to 800 μm while an inner layer has the foamed layer and wherein a sandwich structure of the non-foamed skin layers and the foamed layer exists in a thickness direction.

(6) A method for producing the foam molded product of thermoplastic polyester elastomer resin according to any of (1) to (5), characterized in that, a resin ingredient containing the polyester elastomer resin in a melted state is injected together with a chemical foaming agent and/or inert gas in a supercritical state and filled into a cavity made of clamped plural molds, and, in a stage wherein a non-foamed skin layer having a thickness of 100 to 800 μm is formed on each of a surface layer, at least one of the plural molds is moved to a mold-opening direction so as to expand a volume of the cavity.

(7) The method for producing the foam molded product of thermoplastic polyester elastomer resin according to (6), wherein the inert gas in a supercritical state is nitrogen.

Effects of the Invention

The thermoplastic polyester elastomer resin foam molded product of the present invention is not only excellent in its light weight but also can achieve very high rebound resilience. Further, it exhibits a uniform foamed state, high heat resistance, high water resistance and high molding stability in spite of its high foaming ratio. Accordingly, the thermoplastic polyester elastomer resin foam molded product of the present invention can be applied even to parts which requires high reliability.

MODE FOR CARRYING OUT THE INVENTION

Hereinafter, the thermoplastic polyester elastomer resin foam molded product of the present invention will be illustrated in detail.
[Thermoplastic Polyester Elastomer (A)]
The thermoplastic polyester elastomer (A) used in the present invention is prepared by bonding a hard segment and a soft segment. The hard segment comprises polyester. As to an aromatic dicarboxylic acid constituting the polyester of the hard segment, common aromatic dicarboxylic acid can be widely used and there is no particular limitation therefor. As to a main aromatic dicarboxylic acid, it is desirable to use terephthalic acid or naphthalenedicarboxylic acid (to be more specific, among isomers thereof, 2,6-naphthalenedicarboxylic acid is preferred). Content of the aromatic dicarboxylic acid as such is preferred to be 70 molar % or more, and more preferred to be 80 molar % or more, in the total dicarboxylic acids constituting the polyester of the hard segment. As to other dicarboxylic acid ingredients, there are exemplified an aromatic dicarboxylic acid (such as diphenyl dicarboxylic acid, isophthalic acid and 5-sodium sulfoisophthalate), an alicyclic dicarboxylic acid (such as cyclohexanedicarboxylic acid and tetrahydrophthalic anhydride) and an aliphatic dicarboxylic acid (such as succinic acid, glutaric acid, adipic acid, azelaic acid, sebacic acid, dodecan-dioic acid, dimer acid and hydrogenated dimer acid). They can be used within such an extent that they do not greatly lower a melting point of the resin. Content thereof is 30 molar % or less, preferably 20 molar % or less of the whole acid ingredients.

Further, as to an aliphatic or alicyclic diol constituting the polyester of the hard segment in the thermoplastic polyester elastomer (A) used in the present invention, common aliphatic or alicyclic diol can be widely used and there is no particular limitation therefor. Mostly, it is preferred to be an alkylene glycol having 2 to 8 carbons. To be more specific, there are exemplified ethylene glycol, 1,3-propylene glycol, 1,4-butanediol, 1,6-hexanediol and 1,4-cyclohexane-dimethanol. Among them, any of ethylene glycol and 1,4-butanediol is preferred.

As to the ingredient constituting the polyester of the above hard segment, that which consists of a butylene terephthalate unit (a unit consisting of terephthalic acid and 1,4-butanediol) or that which consists of a butylene naphthalate unit (a unit consisting of 2,6-naphthalene-dicarboxylic acid and 1,4-butanediol) is preferred in view of physical property, molding ability and cost performance.

Furthermore, when the aromatic polyester which is advantageous as the polyester constituting the hard segment in the thermoplastic polyester elastomer (A) used in the present invention is previously produced and is then copolymerized with an ingredient of the soft segment, the aromatic polyester as such can be easily produced in accordance with a common production method for polyester. Still further, the polyester as such is preferred to have a number-average molecular weight of from 10000 to 40000.

The soft segment of the thermoplastic polyester elastomer (A) used in the present invention is at least one member selected from a group consisting of aliphatic polyether, aliphatic polyester and aliphatic polycarbonate.

As to the aliphatic polyether, there are exemplified poly(ethylene oxide) glycol, poly(propylene oxide) glycol, poly(tetramethylene oxide) glycol, poly(hexamethylene oxide) glycol, poly(trimethylene oxide) glycol, a copolymer of ethylene oxide with propylene oxide, an adduct of poly(propylene oxide) glycol with ethylene oxide and a copolymer of ethylene oxide with tetrahydrofuran. Among them, poly(tetramethylene oxide) glycol and the adduct of poly(propylene oxide) glycol with ethylene oxide are preferred in view of elastic property.

As to the aliphatic polyester, there are exemplified poly(ε-caprolactone), polyenantho-lactone, polycaprylo-lactone and poly(butylene adipate). Among them, poly(ε-caprolactone) and poly(butylene adipate) are preferred in view of the elastic property.

The aliphatic polycarbonate is preferred to mainly consist of an aliphatic diol group having 2 to 12 carbons. As to the aliphatic diol as such, there are exemplified ethylene glycol, 1,3-propylene glycol, 1,4-butanediol, 1,5-pentanediol, 1,6-hexanediol, 1,8-octanediol, 2,2-dimethyl-1,3-propane-diol, 3-methyl-1,5-pentanediol, 2,4-diethyl-1,5-pentanediol, 1,9-nonanediol and 2-methyl-1,8-octanediol. An aliphatic diol having 5 to 12 carbons is preferred particularly in view of flexibility and low-temperature characteristics of the resulting thermoplastic polyester elastomer. Those ingredients may be used either solely or jointly by combining two or more thereof if necessary depending upon the cases mentioned below.

As to the aliphatic polycarbonate-diol constituting the soft segment of the thermoplastic polyester elastomer (A) used in the present invention having good low-temperature characteristics, that having a low melting point (such as 70° C. or lower) and a low glass transition temperature is preferred. An aliphatic polycarbonate-diol consisting of 1,6-hexanediol which is usually used in forming a soft segment of a thermoplastic polyester elastomer has a glass transition temperature of as low as about −60° C. and has a melting point of as low as about 50° C. Therefore, its low-temperature characteristics are good. Besides the above, an aliphatic polycarbonate-diol prepared by copolymerization of the above aliphatic polycarbonate-diol with an appropriate amount of 3-methyl-1,5-pentanediol for example has somewhat higher glass transition point as compared with the starting aliphatic polycarbonate-diol but its melting point lowers or it becomes amorphous whereby it corresponds to an aliphatic polycarbonate-diol having good low-temperature characteristics. Moreover, in an aliphatic polycarbonate-diol consisting of, for example, 1,9-nonanediol and 2-methyl-1,8-octanediol, its melting point and glass transition temperature are as sufficiently low as about 30° C. and about −70° C., respectively whereby it corresponds to an aliphatic polycarbonate-diol having good low-temperature characteristics.

As to the soft segment of the thermoplastic polyester elastomer (A) used in the present invention, an aliphatic polyether is preferred in view of solving the problems of the present invention.

The thermoplastic polyester elastomer (A) used in the present invention is preferred to be a copolymer constituted from terephthalic acid, 1,4-butanediol and poly(tetramethylene oxide) glycol as main ingredients. It is preferred that, in the dicarboxylic acid ingredients constituting the thermoplastic polyester elastomer (A), terephthalic acid is 40 molar % or more, more preferred to be 70 molar % or more, further preferred to be 80 molar % or more, and especially preferred to be 90 molar % or more. It is preferred that, in the glycol ingredients constituting the thermoplastic polyester elastomer (A), a total amount of 1,4-butanediol and poly(tetramethylene oxide) glycol is 40 molar % or more, more preferred to be 70 molar % or more, further preferred to be 80 molar % or more, and especially preferred to be 90 molar % or more.

A number-average molecular weight of the above poly(tetramethylene oxide) glycol is preferred to be from 500 to 4000. When the number-average molecular weight is less than 500, elastomer characteristic property may be hardly achieved. On the other hand, when the number-average molecular weight is more than 4000, compatibility with the hard segment may lower whereby it may become difficult to be copolymerized into a block form. The number-average molecular weight of the above poly(tetramethylene oxide) glycol is more preferred to be not less than 800 and not more than 3000, and further preferred to be not less than 1000 and not more than 2500.

In the thermoplastic polyester elastomer (A) used in the present invention, a content of the soft segment is preferred to be 45 to 90% by mass, more preferred to be 55 to 90% by mass, and further preferred to be 60 to 90% by mass. When the content of the soft segment is less then 45% by mass, crystallinity is too high whereby the rebound resilience may be inferior while, when it is more than 90% by mass, crystallinity lowers too much whereby the foam moldability may be inferior.

The thermoplastic polyester elastomer (A) used in the present invention can be produced by known methods. For examples, there are a method wherein a lower alcohol diester of dicarboxylic acid is subjected to a transesterification with an excessive amount of low-molecular glycol and a soft segment ingredient in the presence of a catalyst and the resulting reaction product is subjected to a polycondensation; a method wherein a dicarboxylic acid is subjected to an esterification with an excessive amount of glycol and a soft segment ingredient in the presence of a catalyst and the resulting reaction product is subjected to a polycondensation; a method wherein polyester of a hard segment is previously produced and a soft segment ingredient is added thereto followed by randomizing by means of a transesterification; a method wherein a hard segment and a soft segment are connected using a chain linking agent; and, when poly(ε-caprolactone) is used as a soft segment, a method wherein an ε-caprolactone monomer is subjected to an addition reaction to a hard segment. Any of those methods may be used.

The thermoplastic polyester elastomer (A) may be compounded with a cross-linking agent upon necessity within such an extent that the effect of the present invention is not inhibited thereby. As to the cross-linking agent as such, there is no particular limitation so far as it is a cross-linking agent which reacts with hydroxyl group or carboxyl group in the thermoplastic polyester elastomer (A). Examples thereof are epoxy-type cross-linking agent, carbodiimide-type cross-linking agent, isocyanate-type cross-linking agent, acid anhydride-type cross-linking agent, silanol-type cross-linking agent, melamine resin-type cross-linking agent, metal salt-type cross-linking agent, metal chelate-type cross-linking agent and amino resin-type cross-linking agent. Incidentally, the cross-linking agent may be used either solely or jointly by combining two or more thereof.

In the present invention, a composition containing the thermoplastic polyester elastomer (A) and a cross-linking agent or an additive which will be mentioned later is called "a resin containing a thermoplastic polyester elastomer (A)" or "a resin ingredient containing a thermoplastic polyester elastomer (A)". For the sake of convenience, it will be sometimes called "a polyester elastomer resin composition".

As to the epoxy-type cross-linking agent, there is no particular limitation therefor so far as it is a multifunctional epoxy compound having two or more epoxy groups (glycidyl groups) in a molecule. To be more specific, there are exemplified 1,6-dihydroxynaphthalene diglycidyl ether or 1,3-bis-(oxysilanylmethoxy)benzene having two epoxy groups; 1,3,5-tris-(2,3-epoxypropyl)-1,3,5-triazine-2,4,6-(1H,3H,5H)-trione or diglycerol triglycidyl ether having three epoxy groups; and a polycondensate of 1-chloro-2,3-epoxypropane with formaldehyde and 2,7-naphthalenediol and pentaerythritol polyglycidyl ether having four epoxy groups. Among them, a multifunctional epoxy compound having a heat resistant skeleton is preferred. Particularly preferred one is a two-functional or four-functional epoxy compound having a naphthalene structure as the skeleton or a three-functional epoxy compound having a triazine structure as the skeleton. Two-functional or three-functional epoxy compound is preferred, considering an effect of increasing the melt viscosity of the thermoplastic polyester elastomer (A) or an effect of efficiently lowering an acid value of the thermoplastic polyester elastomer (A), or considering a degree of generation of gelation by aggregation/solidification of the epoxy per se.

Besides the above, there is also exemplified a styrene-type copolymer which contains two or more glycidyl groups in a molecule, has a weight-average molecular weight of 4000 to 25000, and consists of 20 to 99% by mass of vinyl aromatic monomer (X), 1 to 80% by mass of glycidyl (meth)acrylate (Y), and 0-79% by mass of a vinyl group-containing monomer containing no epoxy group (Z) being other than (X). More preferred one is a copolymer consisting of 20 to 99% by mass of (X), 1 to 80% by mass of (Y) and 0 to 40% by mass of (Z). Further preferred one is a copolymer consisting of 25 to 90% by mass of (X), 10 to 75% by mass of (Y) and 0 to 35% by mass of (Z). As to the vinyl aromatic monomer (X), there are exemplified styrene, α-methyl-styrene, etc. As to the glycidylalkyl (meth)acrylate (Y), there are exemplified glycidyl (meth)acrylate, (meth)acrylate having a cyclohexane oxide structure, (meth)acryl glycidyl ether, etc. Among them, glycidyl (meth)acrylate is preferred in view of its high reactivity. As to the other vinyl group-containing monomer (Z), there are exemplified alkyl (meth)acrylate having an alkyl group (which may be either linear or branched chain) of 1 to carbon(s) [such as methyl (meth)acrylate, ethyl (meth)acrylate, propyl (meth)acrylate, butyl (meth)acrylate, 2-ethylhexyl (meth)acrylate, cyclohexyl (meth)acrylate, stearyl (meth)acrylate and methoxyethyl (meth)acrylate]; polyalkylene glycol (meth)acrylate; alkoxyalkyl (meth)acrylate; hydroxyalkyl (meth)acrylate; dialkylamino (meth)acrylate; benzyl (meth)acrylate; phenoxyalkyl (meth)acrylate; isobornyl (meth)acrylate; and alkoxysilylalkyl (meth)acrylate. In addition, (meth)acrylamide, (meth)acryl dialkylamide, vinyl ester (such as vinyl acetate), vinyl ether, an aromatic vinyl-type monomer (such as (meth)allyl ether) and an α-olefin monomer (such as ethylene and propylene), etc. can also be used as the other vinyl group-containing monomer (Z).

A weight-average molecular weight of the above copolymer is preferred to be 4000 to 25000, and more preferred to be 5000 to 15000. An epoxy value of the copolymer is preferred to be 400 to 2500 equivalents/$1\times10^6$ g, more preferred to be 500 to 1500 equivalents/$1\times10^6$ g, and further preferred to be 600 to 1000 equivalents/$1\times10^6$ g.

As to the carbodiimide-type cross-linking agent, there is no particular limitation so far as it is a polycarbodiimide having two or more carbodiimide groups (being a structure of —N=C=N—) in a molecule. Examples thereof are aliphatic polycarbodiimide, alicyclic polycarbodiimide, aromatic polycarbodiimide and a copolymer thereof. Preferred one is an aliphatic polycarbodiimide compound or an alicyclic polycarbodiimide compound.

The polycarbodiimide compound can be prepared by, for example, removing carbon dioxide from a diisocyanate compound. As to the diisocyanate compound which can be used here, there are exemplified 4,4'-diphenyl methane diisocyanate, 4,4'-diphenyl dimethylmethane diisocyanate, 1,3-phenylene diisocyanate, 1,4-phenylene diisocyanate, 2,4-tolylene diisocyanate, 2,6-tolylene diisocyanate, 1,5-naphthylene diisocyanate, hexamethylene diisocyanate, dicyclohexyl-methane diisocyanate, cyclohexane-1,4-diisocyanate, xylylene diisocyanate, isophorone diisocyanate, methylcyclohexane disocyanate, tetramethylxylylene diisocyanate, 1,3,5-tri-isopropylphenylene 2,4-diisocyanate. Only one of them may be used or two or more of them may be copolymerized and used. It is also possible that a branched structure is introduced or a functional group other than carbodiimide group or isocyanate group is introduced by means of copolymerization. Further, although terminal isocyanate may be used as it is, a degree of polymerization may also be controlled by reacting the terminal isocyanate. A part of the terminal isocyanate may also be blocked.

As to the polycarbodiimide compound, an alicyclic polycarbodiimide derived from dicyclohexylmethane diisocyanate, cyclohexane-1,4-diisocyanate, isophorone diisocyanate, etc. is particularly preferred. A polycarbodiimide derived from dicyclohexylmethane diisocyanate or isophorone diisocyanate is particularly preferred.

It is preferable that the polycarbodiimide compound contains 2 to 50 carbodiimide groups per molecule, in view of stability and handling property. It is more preferable that the polycarbodiimide compound contains 5 to 30 carbodiimide groups per molecule. A number of carbodiimide (or, in other words, a number of carbodiimide group) in a polycarbodiimide molecule corresponds to a degree of polymerization in the case of a polycarbodiimide prepared from a diisocyanate compound. For example, the degree of polymerization of a polycarbodiimide prepared by connection of 21 diisocyanate compounds in a chain form is 20, and a number of carbodiimide group in a molecular chain is 20. Usually, a polycarbodiimide compound is a mixture of molecules having various lengths, and thus a number of the carbodiimide group is expressed by a mean value. When a polycarbodiimide compound has a number of the carbodiimide group within the above range and is solid at about a room temperature, it can be made into powder whereby it is excellent in terms of workability and compatibility upon mixing with the thermoplastic polyester elastomer (A) and is preferred in view of uniform reactivity and resistance to bleeding out as well. Incidentally, the number of the carbodiimide group can be measured, for example, by a common method (a method wherein a back titration is conducted with hydrochloric acid after dissolving with an amine).

In view of safety and handling property, it is preferred that the polycarbodiimide compound has an isocyanate group in a terminal thereof and a content of the isocyanate group is from 0.5 to 4% by mass. More preferably, the content of the isocyanate group is from 1 to 3% by mass. Particularly preferred one is a polycarbodiimide derived from dicyclohexylmethane diisocyanate or isophorone diisocyanate and having the content of the isocyanate group within the above-mentioned range. Incidentally, the content of the isocyanate group can be measured by a common method (a method wherein a back titration is conducted with hydrochloric acid after dissolving with an amine).

As to the isocyanate-type cross-linking agent, there are exemplified the above-mentioned polycarbodiimide compound containing isocyanate group and an isocyanate compound which is used as a material for the above-mentioned polycarbodiimide compound.

As to the acid anhydride-type cross-linking agent, a compound having 2 to 4 anhydrides in a molecule is preferred in view of stability and handling property. Examples of such a compound are phthalic anhydride, trimellitic anhydride and pyromellitic anhydride.

Using amount (content) of the cross-linking agent is appropriately adjusted depending upon an extrusion condition, a desired foaming ratio, etc. For example, it is preferred to be 0.1 to 4.5 part(s) by mass, more preferred to be 0.1 to 4 part(s) by mass, and further preferred to be 0.1 to 3 part(s) by mass to 100 parts by mass of the thermoplastic polyester elastomer (A).

Preferable cross-linking agent is an epoxy-type cross-linking agent, particularly an epoxy-type copolymer which contains two or more glycidyl groups in a molecule, has a weight-average molecular weight of 4000 to 25000, and consists of 20 to 99% by mass of vinyl aromatic monomer (X), 1 to 80% by mass of glycidyl (meth)acrylate (Y), and 0-79% by mass of a vinyl group-containing monomer containing no epoxy group (Z) being other than (X). However, when a compound having a functional group exhibiting a quick reactivity such as a carbodiimide group is used together with an epoxy compound, a molecular weight distribution of a resin composition after the cross-linking tends to become narrow. As a result, there is a possibility that an injection pressure upon an injection molding becomes high, foaming nucleus disappears and the foaming ratio lowers. Accordingly, in the resin composition used for the present invention, it is preferred that the epoxy-type cross-linking agent and the carbodiimide-type cross-linking agent are not used together as the cross-linking agent.

The thermoplastic polyester elastomer (A) used in the present invention may be also compounded with various additives other than the above cross-linking agent depending upon the object. A type of the additives as such is not particularly limited but various types of additives which are commonly used for the foam molding can be used. To be more specific, examples of the additives are known antioxidant (of hindered phenol-type, sulfur-type, phosphorus-type, amine-type, etc.), light stabilizer (of hindered amine-type, benzotriazole-type, benzophenone-type, benzoate-type, triazole-type, nickel-type, salicylic-type, etc.), lubricant, filler, flame retardant, flame retardant aid, releasing agent, antistatic agent, molecule adjusting agent (such as a peroxide), metal inactivating agent, organic and inorganic nucleating agent, neutralizing agent, antacid, antibacterial agent, fluorescent bleaching agent and organic and inorganic pigment as well as organic and inorganic phosphorus compound used for imparting flame retardancy and thermal stability. Adding amount of the additives may be appropriately selected within such an extent that it does not deteriorate formation of foams, etc. and the adding amount being usually used for the molding of thermoplastic resin may be adopted.

[Foam Molded Product]

The foam molded product of the present invention is prepared from a resin ingredient containing the above-mentioned thermoplastic polyester elastomer (A) (a polyester elastomer resin composition). The foam molded product of the present invention as such has a non-foamed skin layer existing in a surface layer and a foamed layer existing in an inner layer. Those non-foamed skin layer and foamed layer as such are formed by the above-mentioned polyester elastomer resin composition. Accordingly, they have a foamed structure in a uniform cell state and can express excellent light weight and excellent rebound resilience.

The foam molded product of the present invention usually has a sandwiched structure wherein the non-foamed skin layers are arranged on both sides of the foamed layer (in other words, it has a structure wherein both sides of the foamed layer are sandwiched with the non-foamed skin layers). There is no particular limitation for a size of the foam molded product. A thickness of the sandwiched structure is presumed to be about 1 to 30 mm.

The foamed layer is constituted from a continued resin phase and an isolated foamed cell. Hereinabove, the continued resin phase stands for a part which is formed by a cured polyester elastomer resin composition and which has no cavity. The foamed cell has different characteristic property depending upon its size so far as diameter of the foamed cell (cell diameter) is uniform and is not deviated. In order to achieve high rebound resilience, smaller cell diameter is advantageous. To be more specific, an average cell diameter is preferred to be 10 to 400 µm. When the average cell diameter is less than 10 µm, an inner pressure of the molded product may become low, a pressure upon formation of the non-foamed skin layers may become insufficient and an appearance may become bad forming depressions or the like. On the other hand, when the average cell diameter is more than 400 µm, load bearing may become low and rebound resilience may become low. In addition, even when the cell diameter is small, rebound resilience is inferior if a density is high. Therefore, the average cell diameter is more preferred to be 100 to 400 µm, and further preferred to be 200 to 400 µm when high rebound resilience is required to be achieved with a foamed structure having the density of 0.01 to 0.35 g/cm$^3$ which will be mentioned later. When the average cell diameter of the foamed layer is within the above range, it is possible to apply an appropriate pressure to the non-foamed skin layer, from an inner area of the molded product.

The maximum cell diameter of the foam molded product of the present invention is 10 to 500 µm, and further preferred to be 400 µm or less. Since the foam molded product of the present invention has the maximum cell diameter of 500 µm or less, it exhibits excellent uniformity of the cell structure. In addition, since it does not contain any coarse cell, it exhibits excellent rebound resilience.

The non-foamed skin layer is laminated onto the foamed layer and its thickness is preferred to be 100 to 800 µm. When the thickness of the non-foamed skin layer is less than 100 µm, good appearance may not be achieved while, when it is more than 800 µm, specific gravity of the foamed layer may become too small whereby a foamed structure wherein the density is 0.01 to 0.35 g/cm$^3$ as will be mentioned later may not be prepared in a uniform cell state, as a whole foam molded product. The thickness of the non-foamed skin layer is more preferred to be 200 µm to 600 µm, and further preferred to be 300 µm to 400 µm.

Density of the foam molded product of the present invention is preferred to be 0.01 to 0.35 g/cm$^3$. Density of a common polyester elastomer is about 1.0 to 1.4 g/cm$^3$. Accordingly, it can be said that the foam molded product of the present invention has sufficiently light weight. Density of the foam molded product of the present invention is more preferred to be 0.1 to 0.35 g/cm$^3$, and further preferred to be 0.1 to 0.25 g/cm$^3$. When the density is less than 0.01 g/cm$^3$, sufficient strength may not be achieved and mechanical strength may become inferior while, when it is more than 0.35 g/cm$^3$, sufficient flexibility may not be achieved and rebound resilience may become inferior. In order to achieve both of the excellent strength and the high rebound resilience, the density of the foam molded product is more preferred to be 0.01 to 0.25 g/cm$^3$, and further preferred to be 0.1 to 0.25 g/cm$^3$.

In the foam molded product of the present invention, the average cell diameter is within a specific range, the maximum cell diameter is within a specific range, no coarse cell is contained therein and the density is within a specific range. Therefore, the foam molded product of the present invention has a uniform and fine cell structure and, as a result, the foam molded product of the present invention can achieve rebound resilience of as high as 60 to 90%. In order to achieve high rebound characteristic, the rebound resilience of the foam molded product is preferred to be 70 to 90%.

Figure 1:
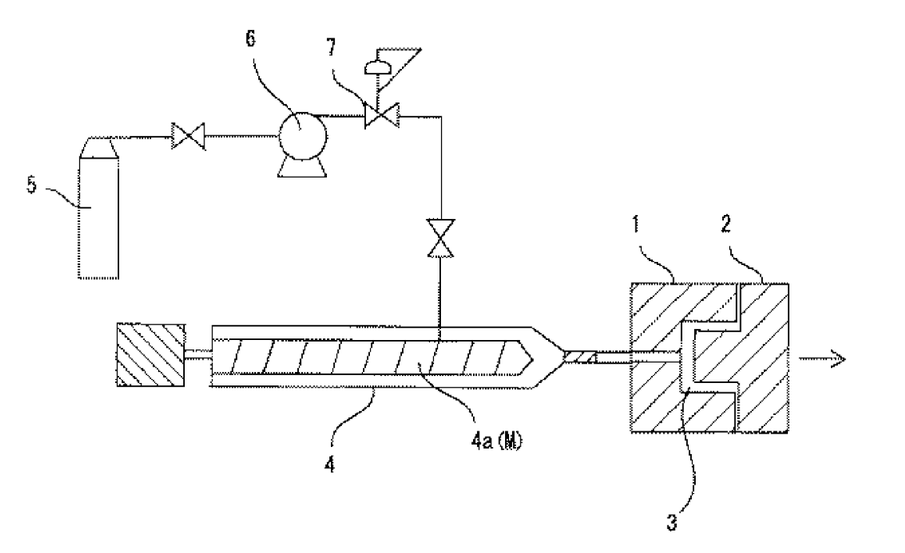
FIG. 1 is a schematic constituting drawing for illustrating an example of a method for producing the foam molded product of the present invention.

Although there is no particular limitation for a foaming method of the foam molded product of the present invention, a preferred one is such a method wherein a resin composition is impregnated with a gas of high pressure and, after that, the pressure is reduced (by releasing the pressure). Particularly, as to a molding method for achieving a uniform foaming and good molding cycle and low cost, a preferred one is a method wherein a volume of a cavity is expanded when a melt mixture of a foaming agent and the polyester elastomer resin composition of the present invention is subjected to an injection molding. To be more specific, as shown in FIG. 1, the polyester elastomer resin in a melted state is injected together with a chemical foaming agent and/or inert gas in a supercritical state (hereinafter, they may be taken together and called as "foaming agent") and filled into a cavity 3 made of clamped plural molds 1, 2, and, in a stage wherein a non-foamed skin layer having a thickness of 100 to 800 μm is formed on each of a surface layer, at least one of the plural molds 2 is moved to a mold-opening direction so as to expand a volume of the cavity 3, whereby the foam molded product is prepared. To be in more detail, when the polyester elastomer resin composition and the foaming agent are filled in the cavity 3 and cooled at a predetermined temperature, the non-foamed skin layer is formed on each of a surface layer of the polyester elastomer resin composition filled into the cavity 3. At a stage wherein this non-foaming skin layer reaches a predetermined thickness (100 to 800 μm), the mold 2 is moved to the mold-opening direction so as to expand the volume of the cavity 3. The polyester elastomer resin composition and the foaming agent may be mixed in a plasticizing region 4a of an injection molding machine 4 before filling them into the cavity 3. When a molding temperature, a cooling time, a time from filling of the resin until a core back (core back retardation time) and a time from a beginning of the core back until its finish (core back transition time) are appropriately adjusted depending upon the material in the foam molding as above, a foam molded product having the aimed skin layer and cell size can be obtained. The molding temperature affects the cell size. When the molding temperature is low, the melt viscosity becomes high whereby the foamed cell is hardly grown and apt to become very small. On the contrary, when the molding temperature is high, the melt viscosity becomes low whereby the cell tends to become large. Therefore, the molding temperature is preferred to be the melting point+(10 to 50° C.), and further preferred to be the melting point+(10 to 40° C.). The core back retardation time affects the thickness of the skin layer. When the core back retardation time is short, the skin layer becomes thin whereby good appearance may not be achieved. On the contrary, when it is long, the skin layer becomes thick whereby the density tends to become high. Therefore, the core back retardation time is preferred to be 0.1 to 3 s, and more preferred to be 0.1 to 1 s. The core back transition time affects the cell size and the foaming ratio. When the core back transition time is short, the cell size tends to be large. On the contrary, when it is long, the material is solidified whereby the foaming ratio tends to become small. Therefore, the core back transition time is preferred to be 0.5 to 5 s, and more preferred to be 1 to 3 s. When the foam molding is conducted under the above conditions, a foam molded product in light weight and exhibiting high rebound resilience can be prepared.

A chemical foaming agent which can be used for preparing the foam molded product of the present invention is added to the resin melted in a resin melting zone of the molding machine, as a gas ingredient which becomes a foaming nucleus or as a generating source thereof.

To be more specific, an inorganic compound such as ammonium carbonate and sodium bicarbonate, an organic compound such as azo compound and sulfohydrazide compound, etc. can be used as the chemical foaming agent. As to the above azo compound, there are exemplified diazocarbonamide (ADCA), 2,2-azoiso-butyronitrile, azohexahydrobenzonitrile and diazoamino-benzene. Among them, ADCA is preferred and is practically used. As to the above sulfohydrazide compound, there are exemplified benzene sufohydrazide, benzene 1,3-disulfohydrazide, diphenylsulfone 3,3-disulfone hydrazide and diphenyl oxide 4,4-disulfone hydrazide. As to the above nitroso compound, there is exemplified N,N-dinitrosopentaethylene tetramine (DNPT). As to the above azide compound, there are exemplified terephthalazide and p-tert-butylbenzazide.

When the chemical foaming agent is used as a foaming agent, the chemical foaming agent also can be used as a foaming agent master batch which contains a thermoplastic resin having lower melting point than a decomposing temperature of the chemical foaming agent as a base material, in order to uniformly disperse in the polyester elastomer resin composition. As to the thermoplastic resin to be used as a base, there is no particular limitation so far as its melting point is lower than the decomposing temperature of the chemical foaming agent. Examples thereof are polystyrene (PS), polyethylene (PE) and polypropylene (PP). In that case, the compounding ratio of the chemical foaming agent to the thermoplastic resin is preferred to be from 10 to 100 parts by mass of the chemical foaming agent to 100 parts by mass of the thermoplastic resin. When the chemical foaming agent is less than 10 parts by mass, the amount of the master batch to the polyester elastomer resin composition becomes too much whereby the physical property may be lowered. When it is more than 100 parts by mass, it is difficult to make into the master batch in view of a problem of dispersibility of the chemical foaming agent.

When the inert gas in a supercritical state is used as the foaming agent, carbon dioxide and/or nitrogen can be used as the inert gas. When carbon dioxide and/or nitrogen in a supercritical state are/is used as the foaming agent, an amount thereof to 100 parts by mass of the polyester elastomer resin composition is preferred to be from 0.05 to 30 part (s) by mass, and more preferred to be from 0.1 to 20 part (s) by mass. When carbon dioxide and/or nitrogen in a supercritical state are/is less than 0.05 part by mass, uniform and fine foamed cell is hardly obtained while, when it is more than 30 parts by mass, appearance of a surface of the molded product tends to be deteriorated.

Although carbon dioxide or nitrogen in a supercritical state used as the foaming agent can be used solely, it is also possible to use a mixture of carbon dioxide and nitrogen. Nitrogen tends to be suitable for forming finer cell for the polyester elastomer resin composition. On the other hand, carbon dioxide can make an infusion amount of the gas relatively more and suitable for achieving the higher foaming ratio. Therefore, nitrogen and carbon dioxide can be freely mixed depending upon the adjusted state of the prepared foamed structure body. The mixing ratio upon mixing is preferred to be within a range of from 1:9 to 9:1 in molar ratio.

As to the foaming agent used in the present invention, nitrogen in a supercritical state is more preferred in view of obtaining the uniform fine foam.

When the polyester elastomer resin composition in a melted state is injected into the cavity 3 together with the foaming agent, the polyester elastomer resin composition in a melted state and the foaming agent may be mixed in the plasticizing region 4a of the injection molding machine 4. Particularly when carbon dioxide and/or nitrogen in a supercritical state are/is used as the foaming agent, it is possible to adopt a method wherein, as shown in FIG. 1 for example, carbon dioxide and/or nitrogen in a gaseous state from a gas bomb 5 are/is compressed either directly or with a pressure-raising pump 6 and infused into the injection molding machine 4. It is necessary that carbon dioxide and/or nitrogen as such are/is in a supercritical state in an inner part of the molding machine in view of solubility, permeability and diffusing property into the polyester elastomer resin composition in a melted state.

Hereinabove, the supercritical state is such a state wherein a discrimination between a gas phase and a liquid phase becomes nil under a specific temperature region and a specific pressure region as a temperature and a pressure of a substance resulting the gas phase and the liquid phase are increased. The temperature and the pressure at that time are called the critical temperature and the critical pressure, respectively. Thus, a substance in a supercritical state has characteristics of both gas and liquid. According, a fluid resulted in this state is called a supercritical fluid. As compared with a gas, the critical fluid as such has high density and, as compared with a liquid, it has low viscosity. Therefore, the critical fluid has such a characteristic property that it is very easily diffusible in a substance.

EXAMPLES

In order to demonstrate the effects of the present invention, Examples will be shown below although the present invention shall not be limited at all by those Examples.

In the Examples and Comparative Examples, following materials were used.

[Thermoplastic Polyester Elastomer (A)]
(Polyester Elastomer A-1)
In accordance with a method mentioned in Japanese Patent Application Laid-Open (JP-A) No. 59491/97, a thermoplastic polyester elastomer containing 78% by mass of a soft segment was prepared using dimethyl terephthalate, 1,4-butanediol and poly(tetramethyleneoxide) glycol having a number-average molecular weight of 2000 as starting materials. This thermoplastic polyester elastomer was designated as a polyester elastomer A-1.
(Polyester Elastomer A-2)
In accordance with a method mentioned in Japanese Patent Application Laid-Open (JP-A) No. 59491/97, a thermoplastic polyester elastomer containing 72% by mass of a soft segment was prepared using dimethyl terephthalate, 1,4-butanediol and poly(tetramethyleneoxide) glycol having a number-average molecular weight of 2000 as starting materials. This thermoplastic polyester elastomer was designated as a polyester elastomer A-2.
(Polyester Elastomer A-3)
In accordance with a method mentioned in Japanese Patent Application Laid-Open (JP-A) No. 59491/97, a thermoplastic polyester elastomer containing 59% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer A-3.
(Polyester Elastomer A-4)
In accordance with a method mentioned in Japanese Patent Application Laid-Open (JP-A) No. 59491/97, a thermoplastic polyester elastomer containing 49% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer A-4.
(Polyester Elastomer A-5)
In accordance with a method mentioned in Japanese Patent Application Laid-Open (JP-A) No. 59491/97, a thermoplastic polyester elastomer containing 41% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer A-5.

[Styrene-Type Copolymer]
A pressurizing reactor of a stirring tank type of one-liter volume equipped with an oil jacket was provided. Temperature of the oil jacket was kept at 200° C. On the other hand, a mixed solution of monomers consisting of 89 parts by mass of styrene (St), 11 parts by mass of glycidyl methacrylate (GMA), 15 parts by mass of xylene (Xy) and 0.5 part by mass of di-tert-butyl peroxide (DTBP) as a polymerization initiator was placed in a material tank. This solution was continuously supplied from the material tank to the reactor with a constant supplying speed (48 g/min., retention time: 12 minutes), and then a reaction solution was continuously discharged from an outlet of the reactor so as to keep an amount of an inner liquid in the reactor constant (about 580 g). Inner temperature of the reactor at that time was kept at about 210° C. After 36 minutes from a stage wherein the inner temperature of the reactor became stable, the discharged reaction solution was introduced into a film distillation machine kept at 30 kPa of vacuum degree and 250° C. of temperature to continuously remove evaporated ingredients whereupon a styrene-type copolymer was obtained. According to GPC analysis (value being calculated as polystyrene), this styrene-type copolymer had a mass-average molecular weight of 8500 and a number-average molecular weight of 3300. Further, its epoxy value was 670 equivalents/$1 \times 10^6$ g and its epoxy value number (a number of average epoxy groups per molecule) was 2.2 according to the following measuring method. This styrene-type copolymer had two or more glycidyl groups in a molecule.

[(Resin Ingredient Containing Thermoplastic Polyester Elastomer (A) (Thermoplastic Polyester Elastomer Resin Composition)]

The styrene-type copolymer was melted and kneaded with 100 parts by mass of the thermoplastic polyester elastomer (A) according to a compounding composition mentioned in Table 1 using a biaxial screw extruder followed by making into pellets to give pellets of A-1' to A-5'. Various physical properties of the resulting polyester elastomer resin compositions A-1' to A-5' were measured by the method which will be mentioned later. Results thereof are shown in Table 1.

[MFR]
MFR of the thermoplastic polyester elastomer resin composition for foam molding was measured in accordance with a measuring method mentioned in ASTM D1238 wherein a load was 2,160 g and a measuring temperature was 230° C.

[Melting Point]

The melting point was measured using a differential scanning calorimeter "DSC type 220" manufactured by Seiko Electronic Industry. To be more specific, a sample to be measured (5 mg) was placed on an aluminum pan and tightly sealed by pushing a cover. The sample was melted at 250° C. for two minutes in nitrogen. Then, a temperature was lowered down to 50° C. at a lowering rate of 20° C./minute, then the temperature was risen from 50° C. to 250° C. at a rate of 20° C./minute, and a thermogram curve was measured. An endothermic peak by melting was determined from the resulting thermogram curve, and was adopted as the melting point.

TABLE 1

|  |  |  | Polyester elastomer resin composition | | | | |
|---|---|---|---|---|---|---|---|
|  |  |  | A-1' | A-2' | A-3' | A-4' | A-5' |
| Polyester elastomer | A-1 | Part(s) by mass | 100 | | | | |
|  | A-2 | Part(s) by mass |  | 100 | | | |
|  | A-3 | Part(s) by mass |  |  | 100 | | |
|  | A-4 | Part(s) by mass |  |  |  | 100 | |
|  | A-5 | Part(s) by mass |  |  |  |  | 100 |
| Cross-linking agent | Styrene-type copolymer | Part(s) by mass | 2 | 3 | 1 | 1 | 1 |
| Content of soft segment |  | Part(s) by mass | 78 | 72 | 59 | 49 | 41 |
| MFR |  | g/10 min | 14 | 8 | 13 | 10 | 10 |
| Melting point |  | ° C. | 160 | 180 | 172 | 182 | 200 |

After that, a foam molded product was prepared by the above-mentioned mold expansion method using the polyester elastomer resin composition obtained hereinabove. As to a mold, there was used a mold for preparing a flat plate consisting of a mold for fixation and a mold for operation. In this mold, a cavity of 100 mm width, 100 mm length and 3 mm thickness can be formed when clamping is done, and a cavity of the same width, the same length and the thickness of (3 mm+core back amount (mm)) can be formed when the mold is core-backed in a mold-opening direction. To be more specific, in a plasticizing region of an electric injection molding machine having a screw wherein a clamping force of the mold is 1800 kN, a screw diameter is 40 mm and a screw stroke is 180 mm, nitrogen which was made into a supercritical state was infused and subjected to injection and filling into the mold adjusted to a surface temperature of as warm as 50° C. After that, the mold for operation was moved to the mold-opening direction to such a length shown as the core back amount (mm) in Table 2 at a stage wherein a non-foamed skin layer of 100 to 800 Jim was formed by an outer pressure of injection and by a foaming pressure from an inside whereby a volume of the cavity was expanded to give the foam molded product. At that time, a molding temperature, a time from filling of the resin until a core back (core back retardation time) and a time from a beginning of the core back until its finish (core back transition time) were appropriately adjusted depending upon the materials whereupon a foam molded product having the aimed cell size was prepared.

Examples 1-6, Referential Example 1, and Comparative Examples 1-3

The foam molded products prepared from the polyester elastomer resin composition were subjected to the following evaluations. Results are shown in Table 2.

[Density (Apparent Density)]

Size of the foam molded product of the polyester elastomer was measured by slide calipers. Mass thereof was measured by an electron balance. The density (apparent density) was calculated by the following formula.

Density(g/cm$^3$)=Mass of Test piece/Volume of Test piece

[Average Cell Diameter, Maximum Cell Diameter]

A photograph of foam cross section of a sample for observation of the cross section was taken under a scanning electron microscope SU 1510 manufactured by Hitachi High Technologies. This photograph was subjected to an image processing. Measurement was done by slide calipers, using a circle-corresponding diameter of at least 100 adjacent cells as a cell diameter. Mean value of such 100 cells was determined. This operation was conducted at arbitrary three places. The three mean values obtained in the three places were averaged and adopted as the average cell diameter.

The maximum cell diameter among the above-observed cell diameters was adopted as the maximum cell diameter.

[Thickness of Skin Layer]

The photograph of foam cross section of a sample for observation of the cross section taken under a scanning electron microscope SU 1510 manufactured by Hitachi High Technologies was subjected to an image processing. A thickness of a unified non-foamed layer found in a surface layer part was measured as the thickness of skin layer.

[Rebound Resilience]

Measurement was conducted according to a method mentioned in JIS K 6400. A manually measuring tester was used. A steel ball was dropped from a stipulated height to a test piece. The maximum height by rebound was read. Three measurements were conducted within one minute. Median thereof was determined to calculate the rebound resilience.

TABLE 2

|  |  |  |  | Example 1 | Example 2 | Example 3 | Example 4 | Example 5 |
|---|---|---|---|---|---|---|---|---|
| (A) | A-1' | Polyester resin composition | Part(s) by mass | 100 | | | | |
|  | A-2' | Polyester resin composition | Part(s) by mass |  | 100 | 100 | 100 | 100 |
|  | A-3' | Polyester resin composition | Part(s) by mass |  | | | | |
|  | A-4' | Polyester resin composition | Part(s) by mass |  | | | | |
|  | A-5' | Polyester resin composition | Part(s) by mass |  | | | | |

TABLE 2-continued

|  |  |  |  |  |  |  |  |
|---|---|---|---|---|---|---|---|
| Material quality | Content of soft segment | % by mass | 78 | 72 | 72 | 72 | 72 |
| Molding conditions | Molding temperature | °C. | 190 | 190 | 190 | 220 | 220 |
|  | Core back amount | mm | 6.0 | 6.0 | 12.0 | 12.0 | 12.0 |
|  | Core back retardation time | sec | 0.1 | 0.1 | 0.1 | 0.1 | 1.0 |
|  | Core back transition time | sec | 1.0 | 1.0 | 1.5 | 1.5 | 1.0 |
| Properties of molded product | Thickness of molded product | mm | 9.0 | 9.0 | 15.0 | 15.0 | 14.5 |
|  | Density (Apparent density) | g/cm³ | 0.35 | 0.36 | 0.22 | 0.22 | 0.23 |
|  | Average cell diameter | μm | 250 | 230 | 280 | 310 | 350 |
|  | Maximum cell diameter | μm | 350 | 320 | 330 | 390 | 450 |
|  | Thickness of skin layer | μm | 350 | 380 | 420 | 390 | 420 |
|  | Rebound resilience | % | 70 | 68 | 71 | 68 | 65 |

|  |  |  |  |  | Example 6 | Referential Example 1 | Comparative Example 1 | Comparative Example 2 | Comparative Example 3 |
|---|---|---|---|---|---|---|---|---|---|
| (A) | A-1' | Polyester resin composition | Part(s) by mass |  |  |  |  |  |  |
|  | A-2' | Polyester resin composition | Part(s) by mass |  |  |  | 100 | 100 |  |
|  | A-3' | Polyester resin composition | Part(s) by mass |  | 100 |  |  |  |  |
|  | A-4' | Polyester resin composition | Part(s) by mass |  |  | 100 |  |  |  |
|  | A-5' | Polyester resin composition | Part(s) by mass |  |  |  |  |  | 100 |
| Material quality | Content of soft segment | % by mass |  |  | 59 | 49 | 72 | 72 | 41 |
| Molding conditions | Molding temperature | °C. |  |  | 190 | 220 | 220 | 240 | 220 |
|  | Core back amount | mm |  |  | 13.5 | 12.0 | 12.0 | 14.0 | 12.0 |
|  | Core back retardation time | sec |  |  | 0.1 | 0.1 | 0.1 | 0.1 | 0.1 |
|  | Core back transition time | sec |  |  | 1.0 | 1.0 | 0.1 | 1.0 | 1.0 |
| Properties of molded product | Thickness of molded product | mm |  |  | 16.5 | 15.0 | 14.5 | 17.0 | 14.5 |
|  | Density (Apparent density) | g/cm³ |  |  | 0.20 | 0.23 | 0.21 | 0.19 | 0.23 |
|  | Average cell diameter | μm |  |  | 280 | 250 | 350 | 780 | 130 |
|  | Maximum cell diameter | μm |  |  | 420 | 350 | 800 | 1100 | 280 |
|  | Thickness of skin layer | μm |  |  | 330 | 350 | 150 | 190 | 320 |
|  | Rebound resilience | % |  |  | 70 | 61 | 58 | 55 | 57 |

As will be apparent from Table 2, all of Examples 1 to 6 being within the scope of the present invention show light weight and high rebound resilience. In Referential Example 1, the rebound resilience is somewhat low as compared with Examples 1 to 6. On the contrary, in Comparative Example 1 wherein the core back transition time is short, the maximum cell diameter of the foam molded product becomes large and is inferior in the rebound resilience. The rebound resilience is also inferior in Comparative Example 2 wherein the average cell diameter is large and Comparative Example 3 wherein the content of the soft segment in the polyester elastomer is low.

INDUSTRIAL APPLICABILITY

The thermoplastic polyester elastomer resin for foam molding and the foam molded product of the present invention are not only excellent in its light weight but also can achieve very high rebound resilience. Further, they exhibit a uniform foamed state, high heat resistance, high water resistance and high molding stability in spite of their high foaming ratio. Accordingly, the thermoplastic polyester elastomer resin for foam molding and the foam molded product of the present invention can be applied even to the parts which are necessary to have high reliability.

EXPLANATION OF REFERENCE NUMBER

1: Mold (for fixation)
2: Mold (for operation)
3: Cavity
4: Injection molding machine
4a: Plasticizing region
5: Gas bomb
6: Pressure-raising pump
7: Pressure-controlling bulb

The invention claimed is:

1. A foam molded product of thermoplastic polyester elastomer resin, comprising:
   a foamed layer consisting of a resin phase and an isolated foamed cell,
   wherein the resin phase contains a thermoplastic polyester elastomer (A),
   wherein the thermoplastic polyester elastomer (A) is prepared by bonding a hard segment and at least one soft segment,
   wherein the hard segment consists of polyester constituted from aromatic dicarboxylic acid and aliphatic and/or alicyclic diol as constituting ingredients,
   wherein the at least one soft segment is selected from the group consisting of aliphatic polyether, aliphatic polyester and aliphatic polycarbonate,
   wherein a content of the soft segment is 55 to 90% by mass,
   wherein an average cell diameter of the foamed cell is 10 to 400 μm,
   wherein the maximum cell diameter of the foamed cell is 10 to 500 μm,
   wherein rebound resilience of the foam molded product is 60 to 90%, and
   wherein density of the foam molded product is 0.1 to 0.35 g/cm³.

2. The foam molded product of thermoplastic polyester elastomer resin according to claim 1, wherein the average cell diameter of the foamed cell is 200 to 400 μm.

3. The foam molded product of thermoplastic polyester elastomer resin according to claim 1, wherein the density of the foam molded product is 0.1 to 0.25 g/cm$^3$.

4. The foam molded product of thermoplastic polyester elastomer resin according to claim 1, wherein the rebound resilience of the foam molded product is 70% to 90%.

5. The foam molded product of thermoplastic polyester elastomer resin according to claim 1,
- wherein each surface of the foam molded product has a non-foamed skin layer having a thickness of 100 to 800 μm,
- wherein an inner layer of the foam molded product includes the foamed layer, and
- wherein the foam molded product has a sandwich structure of the non-foamed skin layers and the foamed layer in a thickness direction.

6. A method for producing the foam molded product of thermoplastic polyester elastomer resin according to claim 1, comprising:
- injecting a resin ingredient containing the polyester elastomer resin in a melted state together with a chemical foaming agent and/or an inert gas in a supercritical state into a cavity defined by clamped plural molds, thereby filling the cavity, and
- when a non-foamed skin layer having a thickness of 100 to 800 μm is formed on each surface of the foam molded product, moving at least one of the plural molds in a mold-opening direction so as to expand a volume of the cavity,
- wherein a core back transition time is 0.5 seconds to 5 seconds, and
- wherein a molding temperature is a melting point of the resin plus 10 to 50° C.

7. The method for producing the foam molded product of thermoplastic polyester elastomer resin according to claim 6, wherein the inert gas in a supercritical state is nitrogen.

* * * * *